US006673169B1

(12) United States Patent
Peterson, Jr. et al.

(10) Patent No.: US 6,673,169 B1
(45) Date of Patent: Jan. 6, 2004

(54) METHOD AND APPARATUS FOR REPAIRING SUPERALLOY COMPONENTS

(75) Inventors: Artie Gene Peterson, Jr., Locust, NC (US); David Wayne Gandy, New London, NC (US); Gregory J. Frederick, Harrisburg, NC (US); Jan T. Stover, Travelers Rest, SC (US); Ramaswamy Viswanathan, Saratoga, CA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 10/115,204

(22) Filed: Apr. 1, 2002

Related U.S. Application Data

(63) Continuation-in-part of application No. 09/487,931, filed on Jan. 20, 2000, now Pat. No. 6,364,971.

(51) Int. Cl.[7] .......................... B23K 10/02; B23K 15/00

(52) U.S. Cl. ..................... 148/524; 148/525; 228/119

(58) Field of Search ............................. 148/524, 525, 148/527; 228/119, 248.1

(56) References Cited

U.S. PATENT DOCUMENTS

| | | | | |
|---|---|---|---|---|
| 4,750,944 A | * | 6/1988 | Snyder et al. | 148/522 |
| 4,804,815 A | | 2/1989 | Everett | |
| 4,811,892 A | * | 3/1989 | Kunzmann et al. | 228/248.1 |
| 4,817,858 A | | 4/1989 | Verpoort | |
| 5,106,010 A | | 4/1992 | Stueber et al. | |
| 5,156,321 A | * | 10/1992 | Liburdi et al. | 228/119 |
| 5,374,319 A | | 12/1994 | Stueber et al. | |
| 5,383,985 A | | 1/1995 | Coulon | |
| 5,470,524 A | * | 11/1995 | Krueger et al. | 419/48 |
| 5,723,078 A | | 3/1998 | Nagaraj et al. | |
| 5,735,044 A | | 4/1998 | Ferrigno et al. | |
| 5,783,318 A | | 7/1998 | Biondo et al. | |
| 5,806,751 A | | 9/1998 | Schaefer et al. | |
| 5,822,852 A | | 10/1998 | Bewlay et al. | |
| 5,846,057 A | | 12/1998 | Ferrigno et al. | |
| 5,897,801 A | | 4/1999 | Smashey et al. | |
| 5,951,792 A | | 9/1999 | Balbach et al. | |
| 6,247,638 B1 | * | 6/2001 | Ress | 228/193 |
| 6,364,971 B1 | | 4/2002 | Peterson, Jr. et al. | |

OTHER PUBLICATIONS

ASM Handbook, vol. 7, Powder Metal Technologies and Applications, p. 605, ASM International, 1998.*
Gandy, D.W., Frederick, G., Viswanathan, R., and Stover, J.D., "Recent EPRI Research & Development Activities in the Weld Repair of Nickel–Based Gas Turbine Blade Superalloys," *EPRI Welding & Repair Technology for Power Plants, 3rd International Conference Proceedings*, Jun. 9–12, 1998.
Gandy, D.W., Viswanathan, R., and Stover, J.D., "Status of Weld Repair Technology for Nickel–Based Superalloy Gas Turbine Blading," *EPRI Final Report*, Apr. 1998.
Hanes, H.D., Seifert, D.A., and Watts, C.R., "Hot Isostatic Processing," *Metals and Ceramics Information Center, Battelle's Columbus Laboratories*, pp. 1–2, 31–32, 46–48, and 58, 1979.

(List continued on next page.)

*Primary Examiner*—George Wyszomierski
(74) *Attorney, Agent, or Firm*—Pennie & Edmonds LLP

(57) ABSTRACT

A method of repairing a metallic component, such as a superalloy turbine blade or turbine nozzle, includes the step of preparing the component by stripping the protective coatings from the component. The component is then preconditioned for welding by a first hot isostatic process. Once the conditioning sequence is complete, the component is welded using any of a number of welding techniques and by adding weld fillers to the weld area. After the welding step, the component is sealed by a second hot isostatic process treatment performed at conditions similar to the first hot isostatic process. The component is finally prepared for re-entry into service.

36 Claims, 7 Drawing Sheets

OTHER PUBLICATIONS

Rinaldi, C. et al., "Automatic Refurbishment of Gas Turbine Components by $CO_2$ Robo–Laser," *Proceedings from Materials Solutions '97 on Joining and Repair of Gas Turbine Components*, pp. 109–117, Sep. 15–18, 1997.

Simkovich, G. and Whitney, E., "Improved Nickel Based Superalloy With Excellent Oxidation Resistance and Weldability," *The Pennsylvania State University*, Jul. 17 1997.

Viswanathan, R. and Scheibel, J., "Assessment of the Laser Welding Process for Superalloy Gas Turbine Blade Welding," *EPRI Repair and Replacement Applications Center, Final Report*, Oct. 1999.

Williams, A.D., "A Case Study of Laser Powder Feed Welding Under Engine Operating Conditions," *EPRI Welding & Repair Technology for Power Plants, 3rd International Conference Proceedings*, Jun. 9–12, 1998.

Hehmann, W., "Laser Weld Repair of Superalloy Gas Turbine Blades", *EPRI Welding & Repair Technology for Power Plants, $3^{rd}$* International Conference, Scottsdale, AZ; Jun. 9–12, 1998.

Gandy, et al., "Overview of Hot Section Component Repair Methods," *ASM Materials Solutions Conference & Exposition, Energy & Utilities Program*, St. Louis, MO, Oct. 9–11, 2000.

Gandy, et al., "Laser Weld Repair of IN738 and GTD111 Buckets" *Proceeding of ASME Turbo Expo 2002*, Jun. 3–6, 2002, Amsterdam, The Netherlands.

* cited by examiner

METHOD AND APPARATUS FOR REPAIRING SUPERALLOY COMPONENTS

This application is a continuation-in-part of U.S. application Ser. No. 09/487,931 filed Jan. 20, 2000, now U.S. Pat. No. 6,364,971, which is incorporated by reference.

BRIEF DESCRIPTION OF THE INVENTION

The present invention relates to a method of repairing metallic components, and in particular to a method of repairing superalloy turbine blades and nozzles.

BACKGROUND OF THE INVENTION

Over the years, superalloy materials have been developed to provide mechanical strength to turbine blades (or "buckets") and nozzles (or "vanes") operating at high temperatures. Most modern high temperature superalloy articles such as nickel-based, precipitation strengthened superalloys are complex alloys at the cutting edge of high temperature metallurgy, and no other class of alloys can match their high temperature strength. This strength makes these alloys very useful in high-temperature high-strength requiring applications, such as turbine components.

These components are difficult and expensive to manufacture, and it is far more desirable to repair a damaged component than to replace one. As a result, a variety of repair methods have been developed, such as conventional fusion welding, plasma thermal metal spraying, brazing, etc. These processes are most suitable for providing relatively thin coatings of weld material. Narrow-gap brazing techniques have been plagued by joint contamination that results in incomplete bonding, even when elaborate thermochemical cleaning processes precede the brazing operation. Narrow gap brazing also lacks the ability to restore damaged or missing areas on a superalloy component or turbine blade. Joints formed using wide gap brazing methods can be difficult to set-up and porosity in the deposited filler material continues to be a concern.

Traditional weld repair methods that are capable of providing thicker coatings, such as gas tungsten arc welding (GTAW) and plasma transferred arc welding (PTAW), have met with only limited success. These traditional methods have been unsatisfactory because the quantities of certain precipitate-forming elements (mainly aluminum and titanium) that are added specifically to superalloys for high temperature strength cause traditional methods to produce poor welds using superalloy weld fillers. Although GTAW and PTAW are the methods most commonly used in turbine blade repair today they use lower strength weld fillers. Thus, their current use is limited to certain blade surfaces that experience very low stress and to other components that are made with other materials. Turbine nozzles, for example, are currently made with cobalt-based superalloys that lend themselves to repair using current welding or brazing methods.

More specifically, weld quality is poor because the elements added for high temperature strength result in welds that have a tendency to form or contain cracks. Two distinct types of cracking have been identified: (1) hot cracking and (2) strain age cracking. Hot cracking occurs in the filler metal and heat affected zone (HAZ) during welding and is typically in the form of tiny fissures, or micro-cracks, beneath the surface of the weldment. Strain age cracking occurs during post weld heat treatment, usually initiating in the HAZ and often propagating well into the adjacent base alloy. Strain age cracks are generally much longer than hot cracks, sometimes extending several inches into the base material.

Weld filler materials that have been most effective in the repair of precipitation strengthened superalloys are those that do not cause hot cracking or strain age cracking. These filler materials are simpler, solid-solution strengthened alloys, but they have significantly lower strength than the superalloys. Therefore, the use of low strength filler materials significantly limits the locations on certain components where weld repairs can be made.

For example, current industry practice for turbine blades permits welding only in areas of very low stress, and some 80 to 90 percent of blade surfaces are non-repairable. Blades with non-repairable damage are generally returned to suppliers as scrap for credit against replacement blades. The financial impact on utilities is considerable since a single air-cooled, rotating blade may cost up to thirty-five thousand dollars, and, depending upon the turbine manufacturer and model, each turbine has multiple blade rows consisting of approximately 90 to 120 blades per row. Turbine blades, however, are not the only components employing high temperature superalloys and requiring repair. Advanced turbines will employ more components made with the more sophisticated superalloys, thereby increasing the number of different superalloy components that may need weld repair. In fact, it is anticipated that future turbine nozzles will be made of nickel-based superalloys such as GTD-111.

Various studies have been conducted to evaluate methods for the repair of precipitation strengthened superalloys. These studies have included evaluations of both narrow and wide-gap brazing, gas tungsten arc welding (GTAW), plasma transferred arc welding (PTAW), and electron beam welding (EBW).

Many experts believe that low heat-high energy welding processes have the highest potential for advancing the state of the art for blade repair. The use of such processes has been shown to reduce cracking while using superalloy weld filler. Laser beam welding (LBW) and EBW are both low heat-high energy processes capable of providing small volume welds with narrow heat affected zones. The laser welding process has seen limited use in the repair of IN-738 superalloy turbine blades. When employed, laser welding has been restricted to regions of very low stress using solid solution strengthened weld filler alloys, mainly IN-625, which provide mechanical properties significantly inferior to those of the base IN-738 material. Structural weld repairs that extend into the more highly stressed regions of the blade cannot be performed currently. EBW is currently being used for the repair of gas turbine stationary nozzles, combustion components, and shaft seals where the joint geometry is relatively straight or in one plane. EBW has inherent limitations in weld path flexibility and must be performed in a vacuum chamber. Application of EBW in the repair of complex blade airfoil shapes would require significant development and is not considered practical at this time. In view of the foregoing, it would be highly desirable to provide an improved technique for repairing metallic parts, such as superalloy turbine blades or other superalloy components.

SUMMARY OF THE INVENTION

According to the invention there is provided a method of repairing a metallic component, such as a superalloy turbine blade or nozzle. The component is prepared by stripping the protective coatings from it. The method of repairing the metallic component comprises subjecting the metallic component to a first hot isostatic processing operation, welding the metallic component, and exposing the metallic component to a second hot isostatic processing operation. In addition, when welding the metallic component, weld fillers may be added to the weld area. The component is finally prepared for re-entry into service.

One of the advantages of the technique of the invention is that the use of precipitation strengthened filler superalloys more closely matches the mechanical properties of the base alloy. Another advantage of the invention is that the use of high energy-low heat methods, such as EBW, as the welding heat source, as opposed to conventional arc welding processes, produces smaller heat affected zones and reduces the stress field due to the lower quantity of heat introduced in the weld zone. A further advantage of the invention is that the introduction of a dual hot isostatic process, which brackets the welding application, preconditions the substrate for welding and reduces any micro-cracking inherent with the superalloy blades after welding.

This repair methodology provides a means to extend the current limits of repair to the more highly stressed areas of the component, or to repair components made of superalloys in general. Thus, the invention also includes components repaired according to the methods of the invention, or a metallic component repaired according to a method comprising subjecting a metallic component to a first hot isostatic processing operation, welding the metallic component, and exposing the metallic component to a second hot isostatic processing operation.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding elements throughout the several drawings.

DETAILED DESCRIPTION OF THE INVENTION

Figure 1:
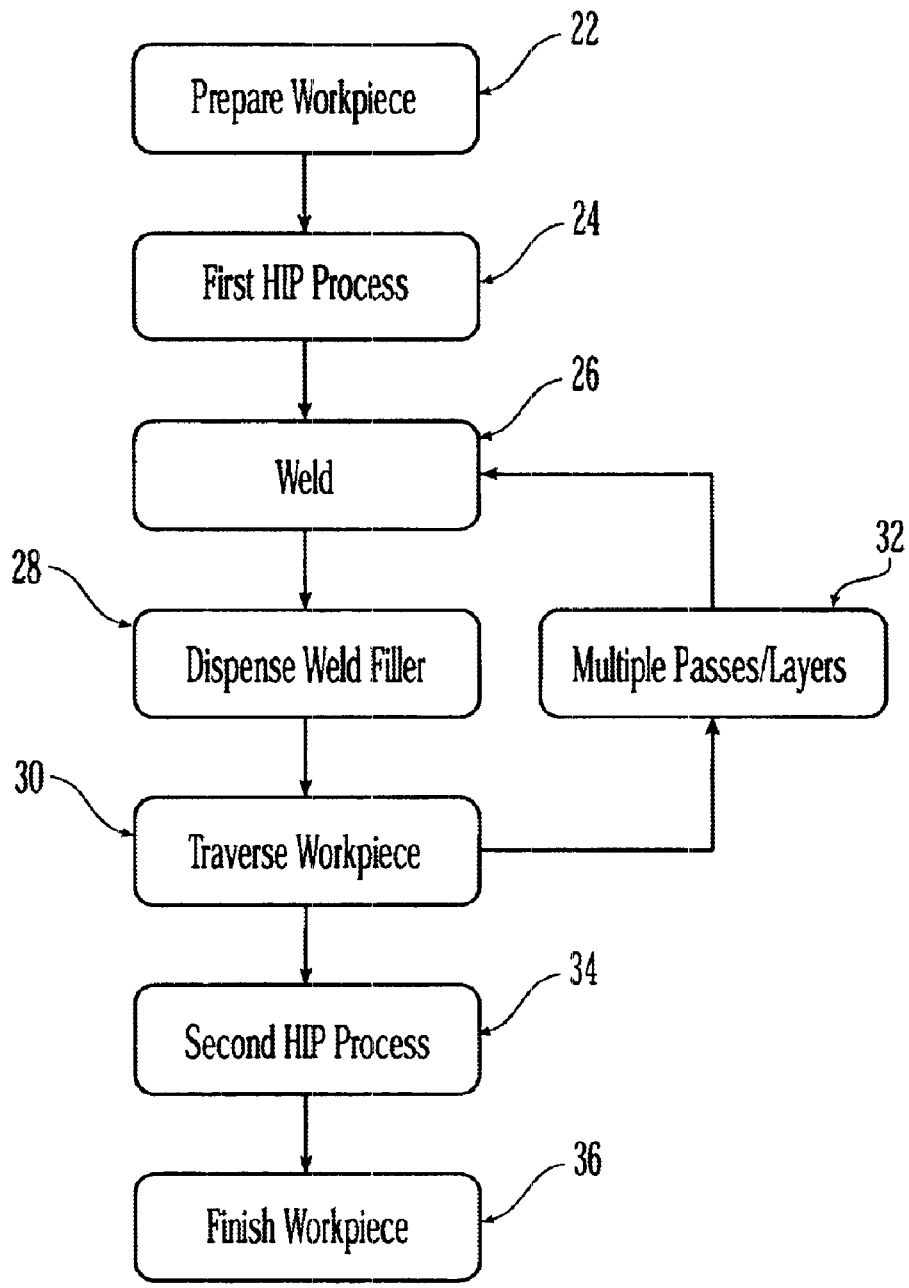
FIG. 1 is a flow chart of an embodiment of the method of the invention.

FIG. 1 is a flow chart of an embodiment of the method of the invention. In the step 22, a workpiece, such as a turbine blade, a turbine nozzle, or other metallic component that has been removed from service, is initially prepared for its repair. This prepare workpiece step 22 may include the stripping of any protective coatings from the workpiece, which is commonly accomplished with chemical stripping solutions. The prepare workpiece step 22 further includes preparing the specific areas of the workpiece that are to be repaired by conventional methods such as machining and grinding.

In the step 24, the workpiece is pre-conditioned for welding by subjecting it to a first hot isostatic process (HIP). Hot isostatic processing can be described as an idealized hot pressing or forging operation, or as high-pressure heat treatment. The basic HIP process subjects a workpiece to a combination of elevated temperatures and isostatic gas pressures (usually inert). Processing is usually carried out in pressure vessels containing internal furnaces at temperatures in the range required for solution annealing. In solution annealing a metal is treated to render it less brittle and more workable. The metal is heated to a common phase and then cooled very slowly and uniformly with time and temperature set to create the desired properties. Annealing increases ductility and relieves internal strains that lead to failures in service. These annealing temperatures coupled with the high pressures generated from the first HIP process 24, tend to close voids that might have existed in the original casting as well as those that are induced by creep deformation during service exposure. Closing these voids aids in crack prevention during subsequent welding since it lowers the number of potential crack initiation sites. Heating to temperatures in the solution annealing range during the HIP process also increases the ductility of the alloy, thereby increasing its ability to accommodate welding strains.

In the step 26, the workpiece is welded. The weld step 26 can be accomplished using a number of welding apparatuses, for example, weld step 26 may use an LBW apparatus; an EBW welding apparatus; a GTAW welding apparatus; or a PTAW welding apparatus, depending in part upon the workpiece 20. Regarding the workpiece's effect on the applicable welding apparatus, some workpieces have a geometry that makes them difficult to weld using certain welding apparatuses. For example, and as discussed previously, EBW may be difficult to use on a complex-geometry part, such as a turbine blade, but it may be used in an, embodiment of the present invention to repair simpler parts, such as a nozzle. Similarly, while traditional methods using GTAW or PTAW to repair superalloy parts are limited to a component's low stress areas, an embodiment of the invention allows using GTAW or PTAW to repair high stress areas.

In the step 28, a weld filler is dispensed. For welding workpieces made of superalloys, dispense weld filler step 28 may dispense a weld filler with strength and temperature properties that are similar to, or the same as, the metal being welded. For example, with turbine blades made of IN-738 the weld fillers generally employed include IN-939, or IN-738, or derivatives of either, and for nozzles made of GTD-111 the weld fillers generally employed are Rene 80, or derivatives thereof.

Figure 3:
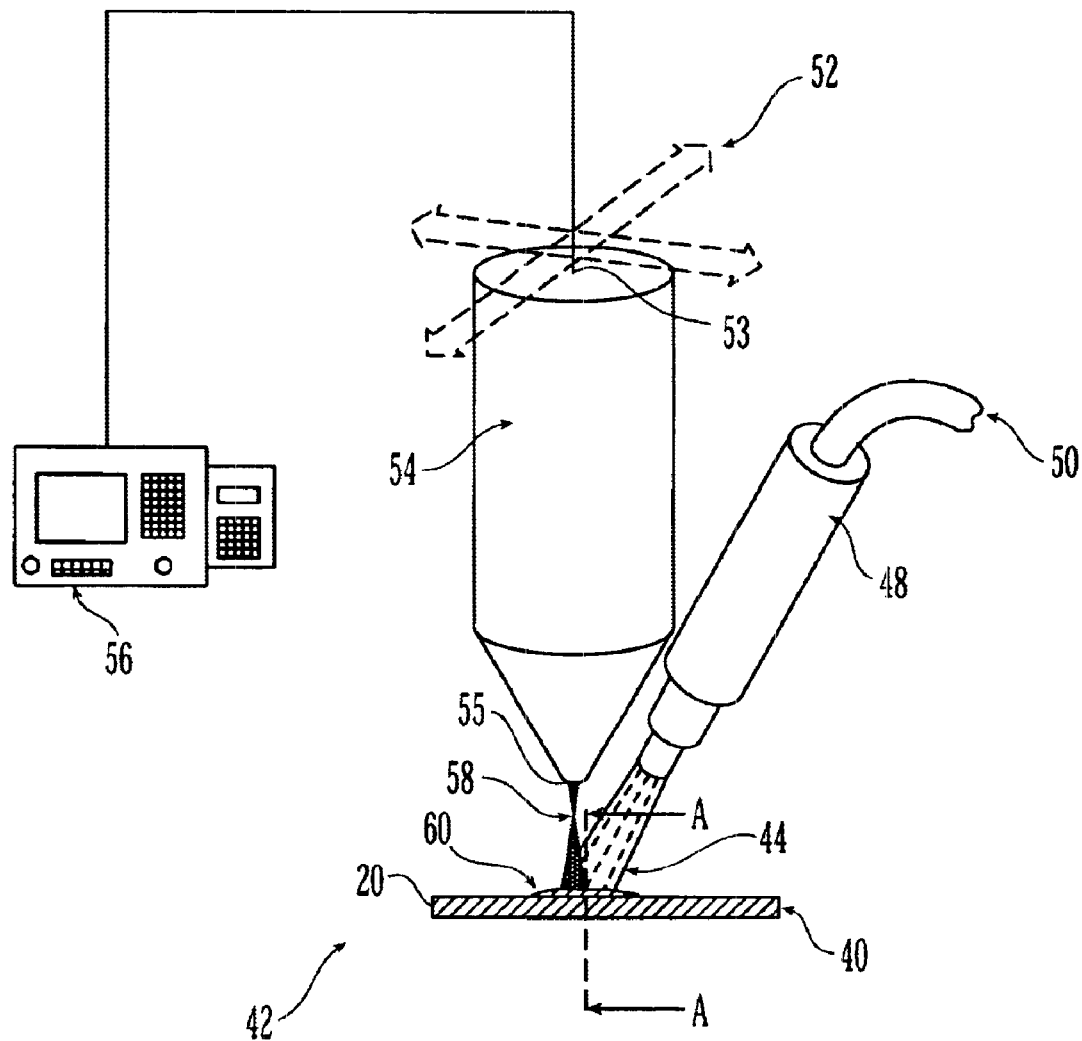
FIG. 3 is a perspective view of a laser welding head and weld filler feeder utilized in accordance with an embodiment of the invention.

In the step 30, the weld apparatus traverses the workpiece. Thus, weld step 26, dispense weld filler step 28, and traverse workpiece step 30 are repeated to weld a workpiece. This repetition is shown in multiple passes/layers step 32. Multiple passes/layers step 32 also accounts for movement of the weld apparatus that is necessary to re-visit a previously welded area on the workpiece and re-weld, or add an additional weld layer to, that previously welded area. The weld apparatus movement for traverse workpiece step 30 and multiple passes/layers step 32 may be accomplished by an apparatus such as a positioner 52, as shown in FIG. 3.

In the step 34, the workpiece is exposed to a second HIP process. The second HIP step 34 is performed to close voids that may have developed during weld step 26 and may be performed at conditions similar to the first conditioning HIP step 24. The second HIP step 34 may include an initial operation to seal any micro-cracking that had intersected the surface of workpiece 20. Typically, micro-cracking does not intersect the surface on small weld buildups; however, it may in large weld repairs or buildups. The micro-crack sealing operation may be performed using a lower strength solid-solution strengthened alloy, such as IN-625 over the IN-939 alloy weld filler used to repair a turbine blade of IN-738. Such a lower strength solid-solution strengthened alloy, even though not suitable for dispense weld filler step 28, may still seal the surface of workpiece 20 such that it can undergo the second HIP process and fuse any micro-cracks that are present. Micro-cracks are discussed in greater detail with reference to FIG. 4.

In the step 36, the workpiece is finished, which typically includes grinding, machining, and re-coating operations. The shaping process may be performed with commercial computer numerically controlled (CNC) equipment that can accommodate components of complex geometry, such as the blade 40 of FIG. 2. The finishing step 36 also includes age heat treating. The workpiece 20 may then be re-introduced into service.

Figure 2:
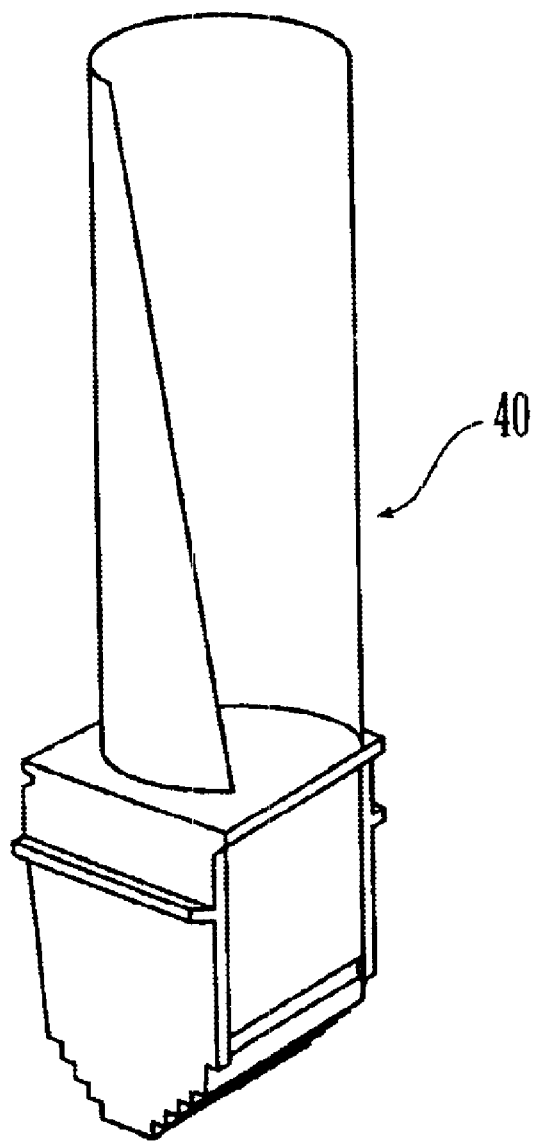
FIG. 2 is a perspective view of a turbine blade processed in accordance with an embodiment of the invention.

FIG. 2 is a perspective view of a turbine blade processed in accordance with an embodiment of the invention. This figures illustrates the complex geometry of the turbine blade that makes it difficult to repair using certain welding apparatuses.

FIG. 3 is a perspective view of a laser welding head and weld filler feeder utilized in accordance with an embodiment of the invention. The laser welding apparatus 42 includes a laser beam 58 that issues from a lower remote end 55 of a weld head 54. The weld head 54 is capable of moving along a plurality of axes by integrating a positioner 52 onto the upper portion 53 of a weld head 54. This motion is controlled by a position controller 56, which may be a computer numerically controlled positioning mechanism (CNC). A feed pipe 50 introduces precipitation strengthened superalloy weld fillers 44 to a weld application area 60 via a powder feed system 48. The weld filler 44 is typically in a powder form and is employed to replace the component alloy in damaged areas. The laser beam 58, together with the weld filler 44, is directed at the weld application area 60 on the area of the workpiece 20 being repaired.

As mentioned with respect to FIG. 1, the laser welding process can be used to repair equiaxed IN-738 turbine blades and in such a case the weld fillers generally employed are of the IN-939 type or deriviatives thereof. The laser welding apparatus 42 may utilize a Nd:YAG (Yttrium Aluminum Garnet—Doped with Nd) laser or a carbon dioxide laser, but is not limited to either.

Figure 4:
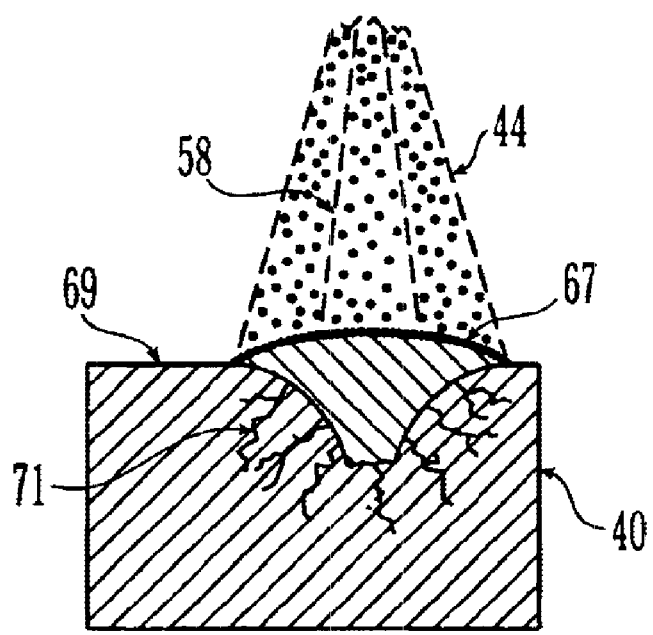
FIG. 4 is a cross sectional view taken along the line A—A of FIG. 3.

FIG. 4 is a cross sectional view taken along the line A—A of FIG. 3. Due to the high strength of the blade material, very small cracks 71 (commonly referred to as micro-cracking or fissures) tend to form directly under the applied weld bead 67. These cracks do not intersect the surface 69 of the blade 40 and thus are capable of being sealed by a second HIP process. This second HIP step is depicted by step 34 in FIG. 1. The second HIP step 34 is performed at conditions similar to the first conditioning HIP step 24. The second HIP step 34 may include an initial micro-cracking sealing operation to seal the very small cracks 71, should any have intersected the surface 69, although they typically do not with small weld buildups. This micro-cracking sealing operation may be performed using a solid-solution strengthened alloy, such as IN-625 over a IN-939 alloy. The weld buildup of IN-625 is used to seal the surface so that it can undergo the second HIP process and fuse any micro-cracks that are present.

The use of LBW combined with precipitation-strengthened filler superalloys and hot isostatic processing provides the ability to perform welds that have higher strength. The present invention therefore allows repairs to be made in the higher stressed regions of the blade. These repairs, in many cases, will permit repair of blades that would have previously been scrapped.

An EBW apparatus could also be used in weld step 26 instead of an LBW apparatus in many instances. As discussed earlier, LBW and EBW are both low heat-high energy processes capable of providing small volume welds with narrow heat affected zones. EBW must be performed in a vacuum chamber and has inherent limitations in weld path flexibility. These limit its use to certain applications. But since EBW is currently being used for the repair of gas turbine stationary nozzles, combustion components and shaft seals where the joint geometry is relatively straight or in one plane, EBW can be used in weld step 26 when those or similar components are repaired according to the method of the invention.

Figure 5:
FIG. 5 is a perspective view of a turbine nozzle processed in accordance with an embodiment of the invention.

FIG. 5 is a perspective view of a turbine nozzle processed in accordance with an embodiment of the invention. This figure illustrates the geometry of a turbine nozzle 62 that allows using a GTAW to repair it.

Figure 6:
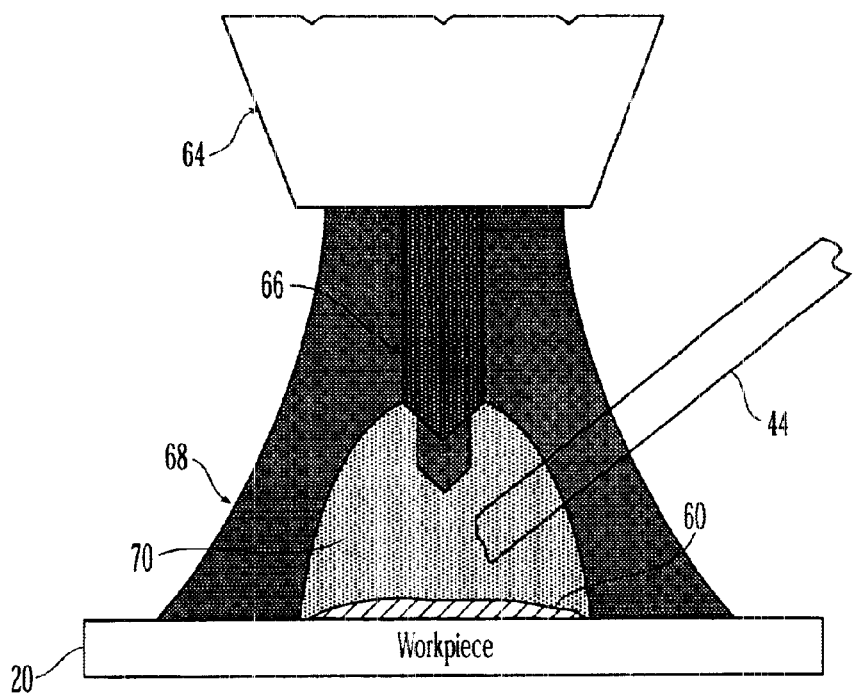
FIG. 6 is a perspective view of a gas tungsten arc welding (GTAW) apparatus utilized in accordance with an embodiment of the invention.

FIG. 6 is a perspective view of a GTAW apparatus utilized in accordance with an embodiment of the invention. This is also sometimes known as tungsten inert gas welding (TIG). GTAW is currently used to weld turbine blades and nozzles. GTAW is often a manual operation and, therefore, is also useful where the workpiece has unusual geometry, or is repaired so rarely that developing a computer controlled process is inefficient, although GTAW is often computer controlled.

GTAW typically requires a solid welding rod to supply a weld filler, which, when they are solid weld filler rods of the superalloy type, are difficult to fabricate in wire or spool form due in part to their high strength. When a GTAW process is controlled by computer it employs a wire or spool feed system (not shown) that is similar to powder feed system 48 in that it can also be controlled by a computer (not shown) to supply weld filler. One of ordinary skill in the art is aware that wire or spool feed systems are common, and superalloy wires or spools themselves, though expensive and difficult to manufacture, are known as well.

In the representative GTAW apparatus depicted in FIG. 6, an electrode 66 projects from a torch body 64 toward a workpiece 20. An arc 70 is created between the electrode 66 and the workpiece 20 by causing a potential difference between them. A shielding gas 68 passes through the torch body 64 and surrounds the electrode 66, arc 70, and the weld application area 60. Thus, the arc 70 is shielded from the atmosphere by the shielding gas 68, which is an inert gas and usually argon gas. Weld filler 44, typically a solid rod in the case of GTAW, is supplied to the arc 70.

In an embodiment of the invention GTAW is used in weld step 26 of FIG. 1. GTAW is an appropriate welding method in weld step 26 where the workpiece has a complex geometry that does not lend itself to computer-controlled welding. For example, turbine nozzles that are made of high temperature superalloys could be repaired using GTAW in weld step 26 of the present invention with weld filler supplied in the form of a rod and manually guided to the appropriate area of the arc.

Figure 7:
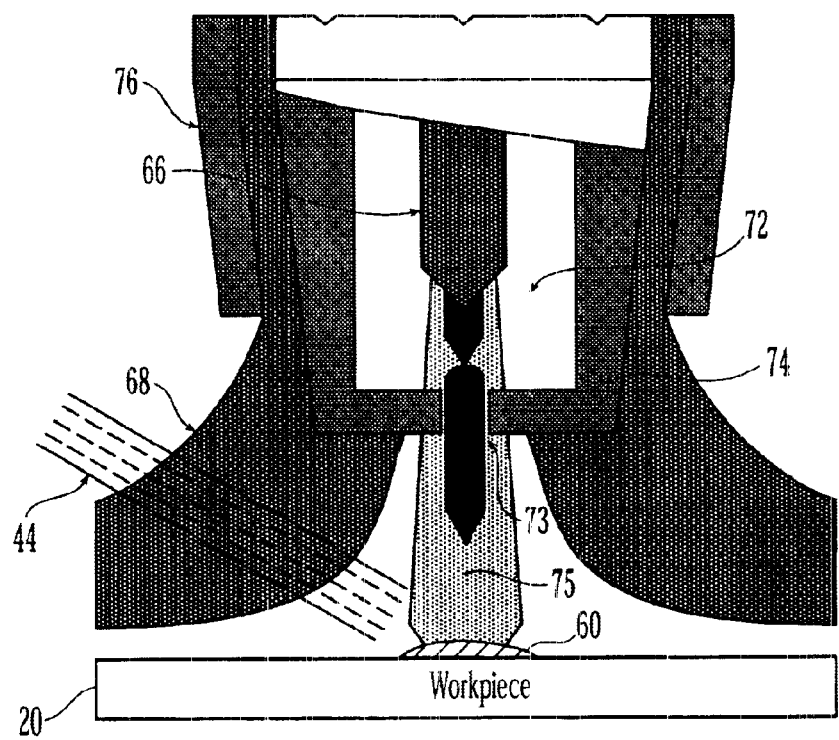
FIG. 7 is perspective view of a plasma transferred arc welding (PTAW) apparatus utilized in accordance with an embodiment of the invention.

FIG. 7 is perspective view of a PTAW apparatus utilized in accordance with an embodiment of the invention. PTAW, like GTAW, is currently used to repair turbine blades and nozzles. Unlike GTAW, however, PTAW typically uses weld filler 44 supplied in the form of a powder. Thus PTAW may use powder feed system 48 of FIG. 3. If the welded component requires a superalloy weld filler, then PTAW may lend itself more readily to computer control than GTAW, since superalloy weld fillers 44 are found more easily in powder form.

In the representative PTAW apparatus depicted in FIG. 7, an electrode 66 projects toward an orifice 73 within an orifice body 74. Orifice gas 72 flows around electrode 66 and through orifice 73 towards workpiece 20. A plasma arc 75 is created between the electrode 66 and the workpiece 20 by causing a potential difference between them through orifice gas 72 (in a non-transferred plasma arc welding apparatus the potential is created between the electrode 66 and the orifice body 74). An outer shield cup 76 surrounds the orifice body 74. A shielding gas 68 passes between the outer shield cup 76 and orifice body 74 and surrounds the plasma arc 75 and weld application area 60. Thus, the plasma arc 75 and weld application area 60 are shielded from the atmosphere by the shielding gas 68, which is an inert gas and usually argon gas. Weld filler 44, which is typically powder, is supplied to the plasma arc 75 using a powder feed system 48 of FIG. 3.

PTAW systems have the advantages of laser welding systems that they can be automated and thus used where fine control of the process is necessary, although PTAW, like GTAW, is a higher energy process than laser welding and may cause more strain age cracking or hot cracking before the second HIP. Where that does not significantly concern the user, however, PTAW may be desired over laser welding systems because PTAW is a manual process and has relatively lower costs associated with the equipment.

Those skilled in the art will appreciate that the techniques of the invention can be used to effectuate a variety of repairs. For example, another form of repair is that type performed following damage to the blade by excessive erosion, hot-corrosion, or over-stripping. With this form of damage, turbine blades can become too thin to be repaired by conventional welding methodologies. With LBW, in particular, repairs can be performed on much thinner members; thus, the surface of the blade that has suffered from one of these forms of damage can be restored using a weld overlay technique.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description.

We claim:

1. A method of repairing a metallic component, comprising:
    subjecting a metallic component to a first hot isostatic processing operation,
    welding the metallic component; and
    exposing the metallic component to a second hot isostatic processing operation;
    wherein said welding comprises plasma transferred arc welding.

2. The method of claim 1, further comprising sealing micro-cracking prior to said exposing.

3. The method of claim 1, wherein said subjecting and said exposing are performed at temperatures required for solution annealing.

4. The method of claim 1, wherein the metallic component comprises a super-alloy metallic component.

5. The method of claim 1, further comprising delivering a weld filler to the metallic component.

6. The method of claim 5, wherein said weld filler comprises a precipitation strengthened super-alloy.

7. The method of claim 6, wherein said precipitation strengthened super-alloy comprises IN-939 or a derivative thereof.

8. The method of claim 6, wherein said precipitation strengthened super-alloy comprises IN-738 or a derivative thereof.

9. The method of claim 6, wherein said precipitation strengthened super-alloy comprises Rene 80 or a derivative thereof.

10. The method of claim 5, wherein said welding the metallic component comprises a turbine blade.

11. The method of claim 5, wherein the metallic component comprises a turbine-nozzle.

12. The method of claim 1, wherein said welding comprises traversing the metallic component at least once.

13. The method of claim 12, further comprising repeating said traversing.

14. The method of claim 1, further comprising preparing the metallic component for repair prior to said subjecting.

15. The method of claim 14, wherein said preparing comprises:
    chemically stripping the metallic component;
    machining the metallic component; and
    grinding the metallic component.

16. The method of claim 1, further comprising finishing the metallic component after said exposing.

17. The method of claim 16, wherein said finishing comprises a process selected from the group consisting of grinding the metallic component, machining the metallic component, re-coating the metallic component, age heat treating the metallic component and combinations thereof.

18. The method of claim 1, wherein said welding comprises replacing material absent in an area of the metallic component.

19. A method of claim 1, repairing a metallic component, comprising:
    subjecting a metallic component to a first hot isostatic processing operation;
    welding the metallic component; and
    exposing the metallic component to a second hot isostatic processing operation;
    wherein said welding comprises electron beam welding.

20. The method of claim 19, further comprising sealing micro-cracking prior to said exposing.

21. The method of claim 19, wherein said subjecting and said exposing are performed at temperatures required for solution annealing.

22. The method of claim 19, wherein the metallic component comprises a super-alloy metallic component.

23. The method of claim 19, further comprising delivering a weld filler to the metallic component.

24. The method of claim 23, wherein said weld filler comprises a precipitation strengthened super-alloy.

25. The method of claim 24, wherein said precipitation strengthened super-alloy comprises IN-939 or a derivative thereof.

26. The method of claim 24, wherein said precipitation strengthened super-alloy comprises IN-738 or a derivative thereof.

27. The method of claim 24, wherein said precipitation strengthened super-alloy comprises Rene 80 or a derivative thereof.

28. The method of claim 23, wherein the metallic component comprises a turbine blade.

29. The method of claim 23, wherein the metallic component comprises a turbine-nozzle.

30. The method of claim 19, wherein said welding comprises traversing the metallic component at least once.

31. The method of claim 30, further comprising repeating said traversing.

32. The method of claim 19, further comprising preparing the metallic component for repair prior to said subjecting.

33. The method of claim 32, wherein said preparing comprises:

chemically stripping the metallic component;

machining the metallic component; and grinding the metallic component.

34. The method of claim 19, further comprising finishing the metallic component after said exposing.

35. The method of claim 34, wherein said finishing comprises a process selected from the group consisting of grinding the metallic component, machining the metallic component, re-coating the metallic component, age heat treating the metallic component and combinations thereof.

36. The method of claim 19, wherein said welding comprises replacing material absent in an area of the metallic component.

* * * * *

UNITED STATES PATENT AND TRADEMARK OFFICE
CERTIFICATE OF CORRECTION

PATENT NO. : 6,673,169 B1  Page 1 of 1
DATED : January 6, 2004
INVENTOR(S) : Artie Gene Peterson, Jr. et al.

It is certified that error appears in the above-identified patent and that said Letters Patent is hereby corrected as shown below:

Column 8,
Line 48, begins with: "A method of claim 1, repairing a metallic component, comprising:" should appear as: -- A method of repairing a metallic component, comprising: --

Signed and Sealed this

Eighth Day of June, 2004

JON W. DUDAS
*Acting Director of the United States Patent and Trademark Office*